Aug. 9, 1938.　　　　R. D. PROVINSON　　　　2,126,661
AIR BRAKE SYSTEM FOR AUTOMOTIVE VEHICLES
Filed March 19, 1936　　　6 Sheets-Sheet 1
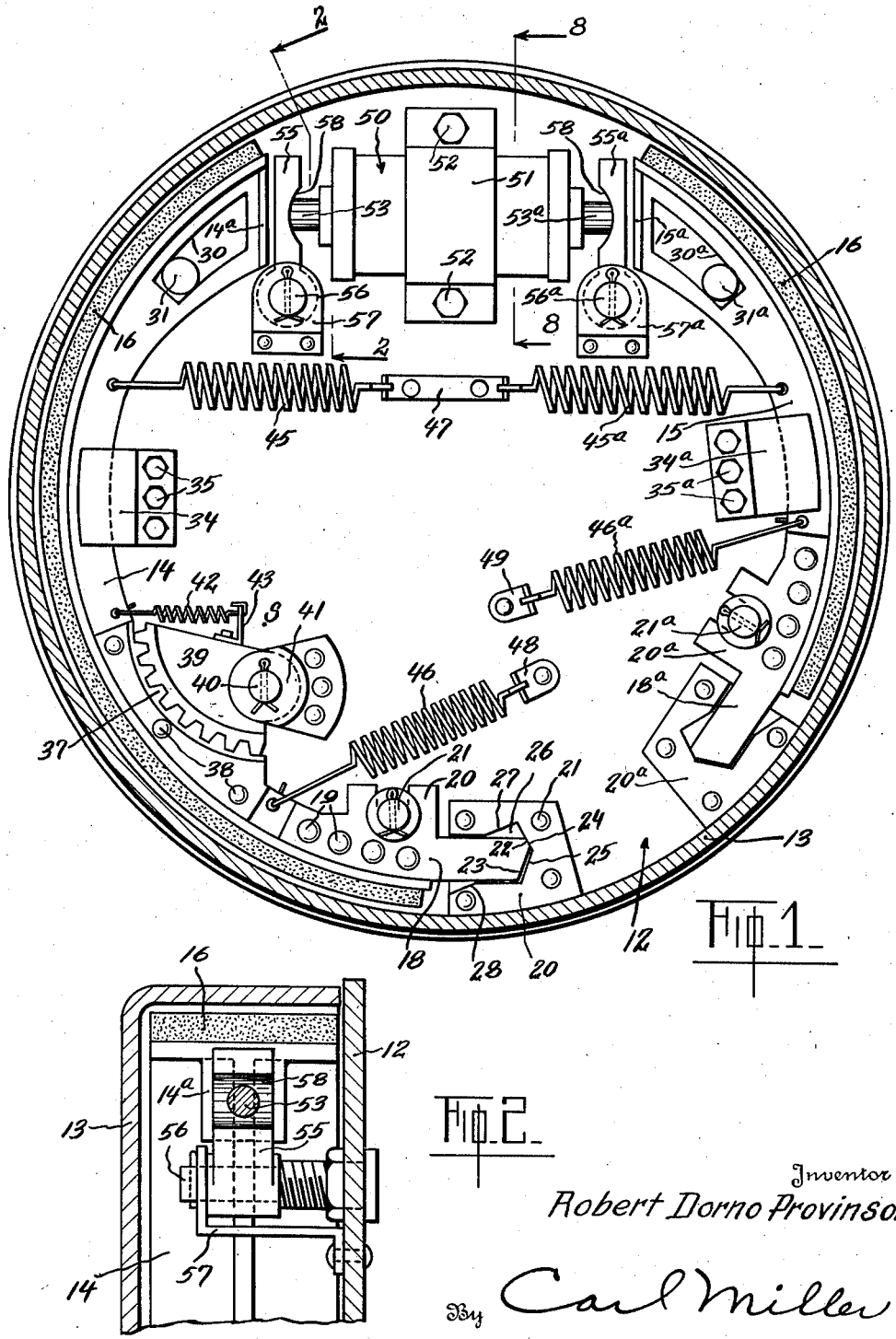
Inventor
Robert Dorno Provinson
By Carl Miller
Attorney

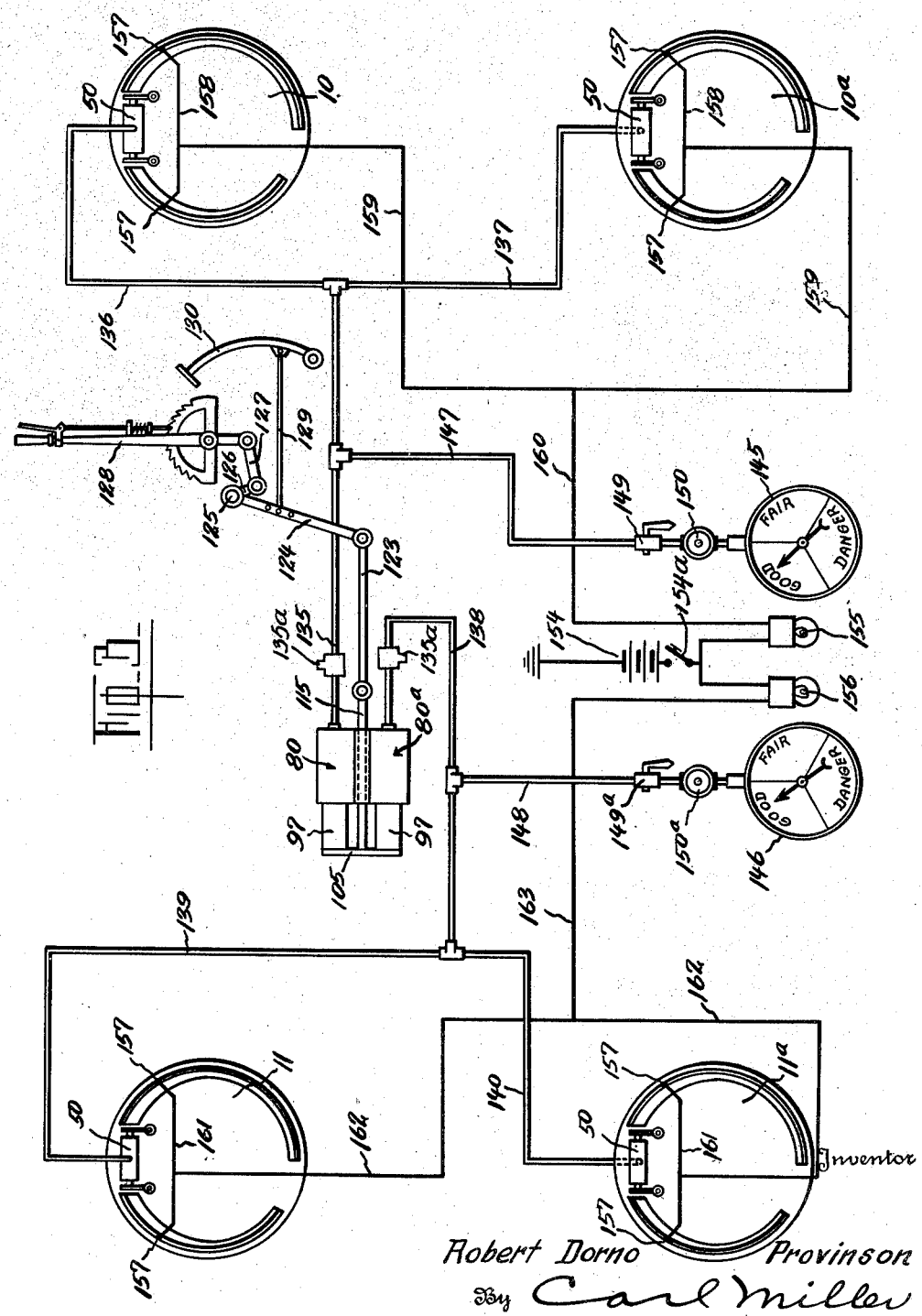

Aug. 9, 1938.    R. D. PROVINSON    2,126,661
AIR BRAKE SYSTEM FOR AUTOMOTIVE VEHICLES
Filed March 19, 1936    6 Sheets-Sheet 3
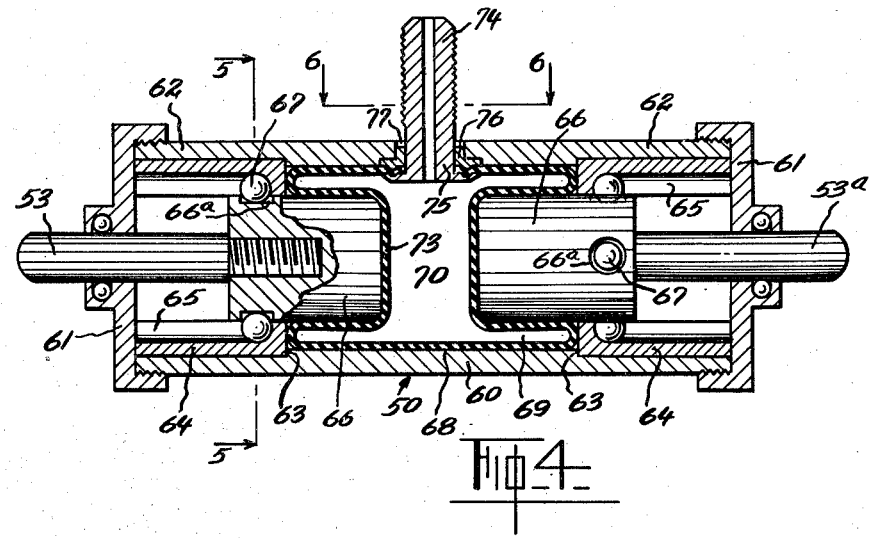
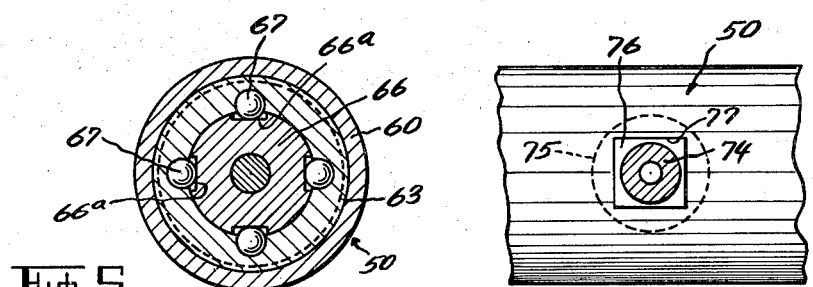 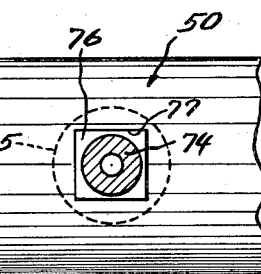
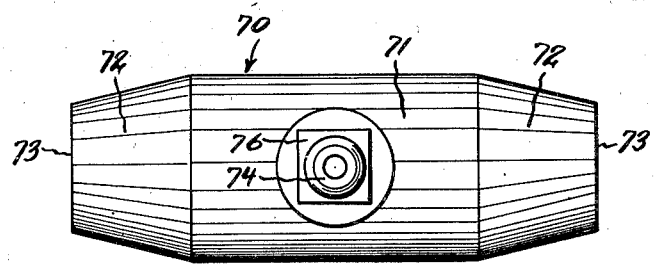
Inventor
Robert Dorno Provinson
By Carl Miller
Attorney Aug. 9, 1938.  R. D. PROVINSON  2,126,661
AIR BRAKE SYSTEM FOR AUTOMOTIVE VEHICLES
Filed March 19, 1936  6 Sheets-Sheet 4
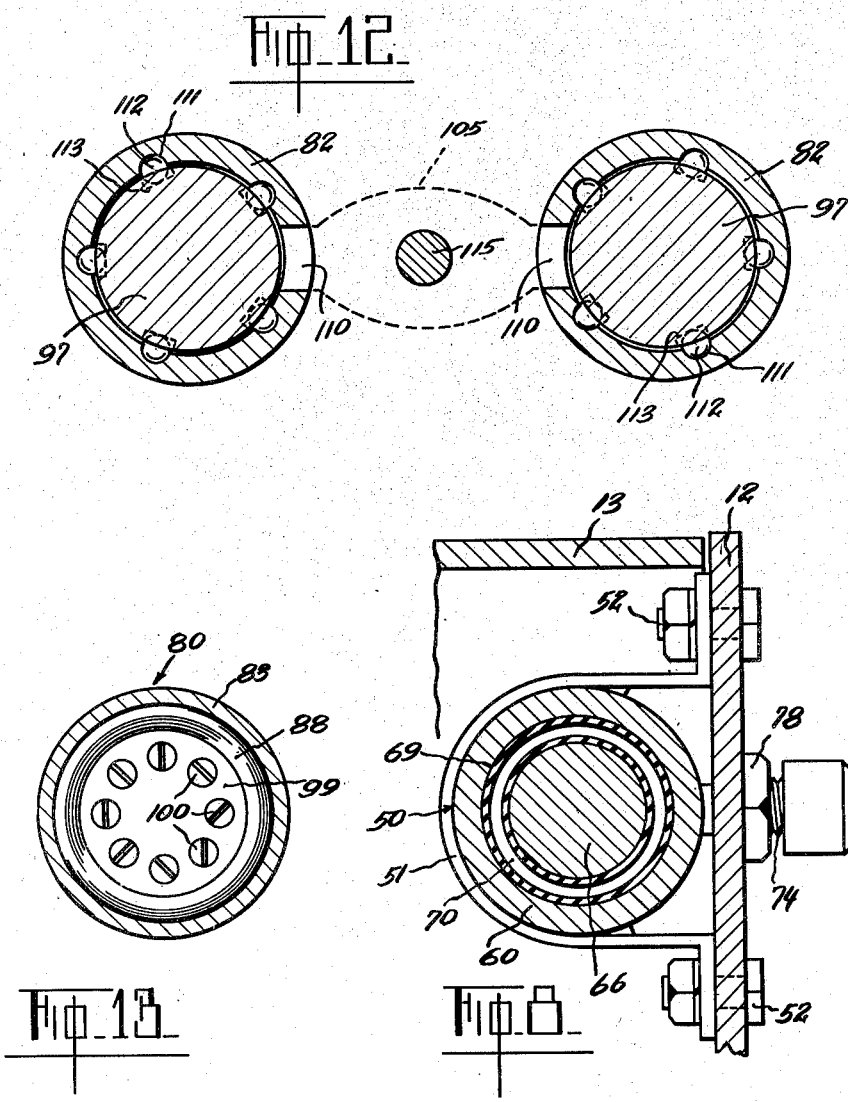
Inventor
Robert Dorno Provinson
By Carl Miller
Attorney

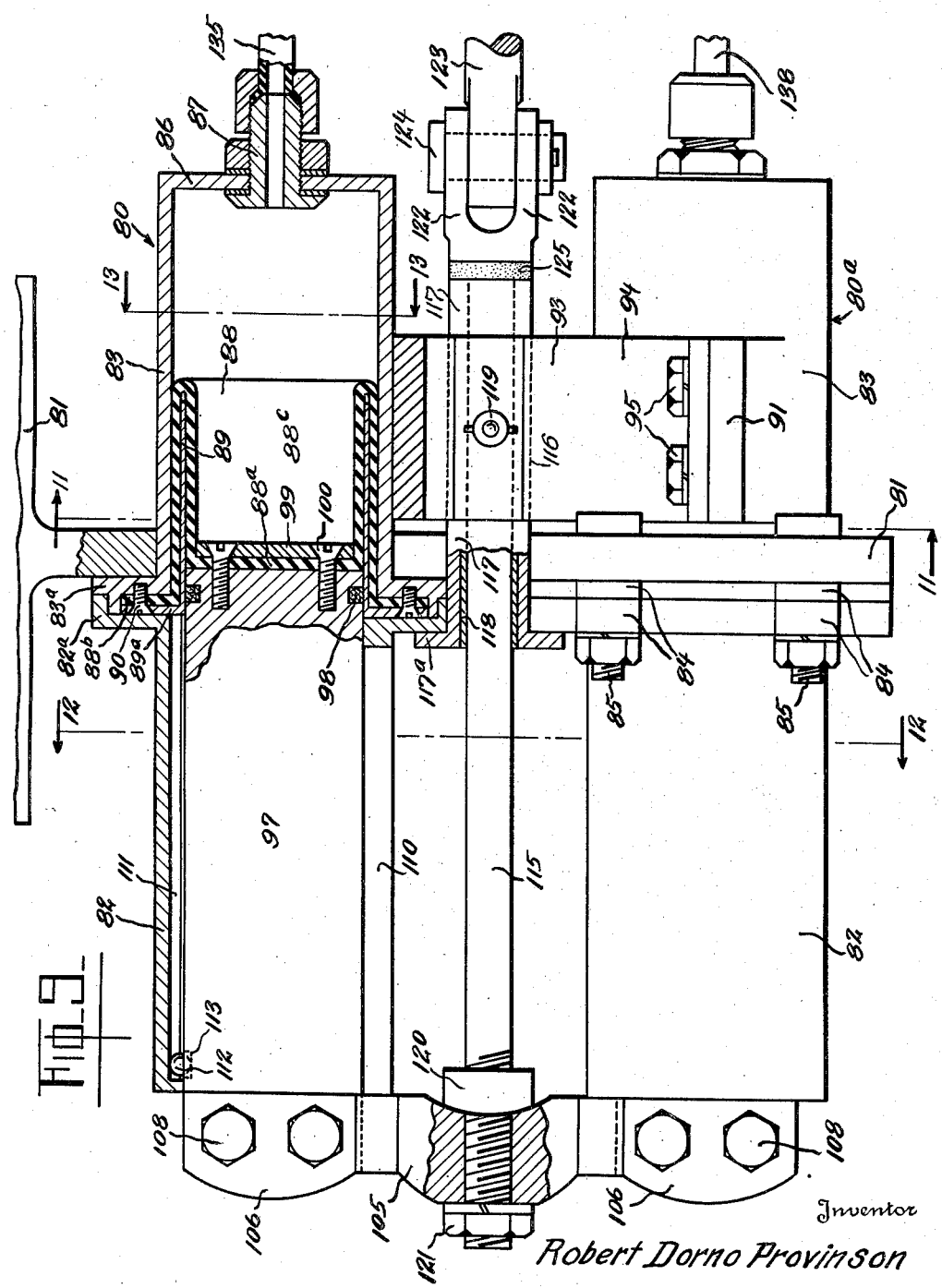

Patented Aug. 9, 1938

2,126,661

UNITED STATES PATENT OFFICE 2,126,661

AIR BRAKE SYSTEM FOR AUTOMOTIVE VEHICLES

Robert Dorno Provinson, Pittsburgh, Pa.

Application March 19, 1936, Serial No. 69,638

5 Claims. (Cl. 188—152)

This invention relates to an air brake system for motor vehicles and to means for controlling the same, the principal object being the provision of a new and novel construction whereby various advantages may be obtained over the conventional constructions now in use.

Other objects of the invention are as follows:—

First, to provide a four wheel air brake system wherein the front wheel brakes and the rear wheel brakes are controlled by separate master air cylinders.

Second, to provide a simple operating mechanism for controlling the master air cylinders simultaneously.

Third, to provide an indicating mechanism for ascertaining the condition of the brakes and the degree of lining wear.

Fourth, to provide a signalling mechanism to indicate when the brakes are dragging.

Fifth, to provide a brake structure of the self-energizing type including a novel and highly efficient form of air cylinder.

Sixth, to provide in the air brake system a means for adjusting and equalizing the pressure in the front brakes independently of the rear brakes and vice versa.

Seventh, to provide a form of brake and associated brake system which will be simple and cheap to manufacture, of comparatively few parts and which will be easy to keep in operative position.

Further and other objects and advantages will appear from the specification and claims, and from the drawings which show by way of illustration what is now considered the preferred embodiment of the invention.

Figure 1 is a plan view of one of the brakes with the brake drum in section.

Figure 2 is a detail sectional view taken on line 2—2, Figure 1.

Figure 3 is a diagrammatic view showing the entire four wheel brake system.

Figure 4 is a longitudinally sectional view through one of the brake air cylinders.

Figure 5 is a sectional view therethrough taken on line 5—5, Figure 4.

Figure 6 is a detail partial plan view taken on line 6—6, of Figure 4 showing the air fitting application to the cylinder wall.

Figure 7 is a plan view of a fully expanded rubber tube removed from the brake air cylinder.

Figure 8 is a sectional view of the brake air cylinder taken on line 8—8, Figure 1, showing the mounting thereof on the brake backing plate.

Figure 9 is a plan view, partly in section of the master air cylinder assembly.

Figure 12 is a sectional view taken on line 12—12, Figure 9.

Figure 13 is a sectional view taken on line 13—13, Figure 9.

Figure 10:
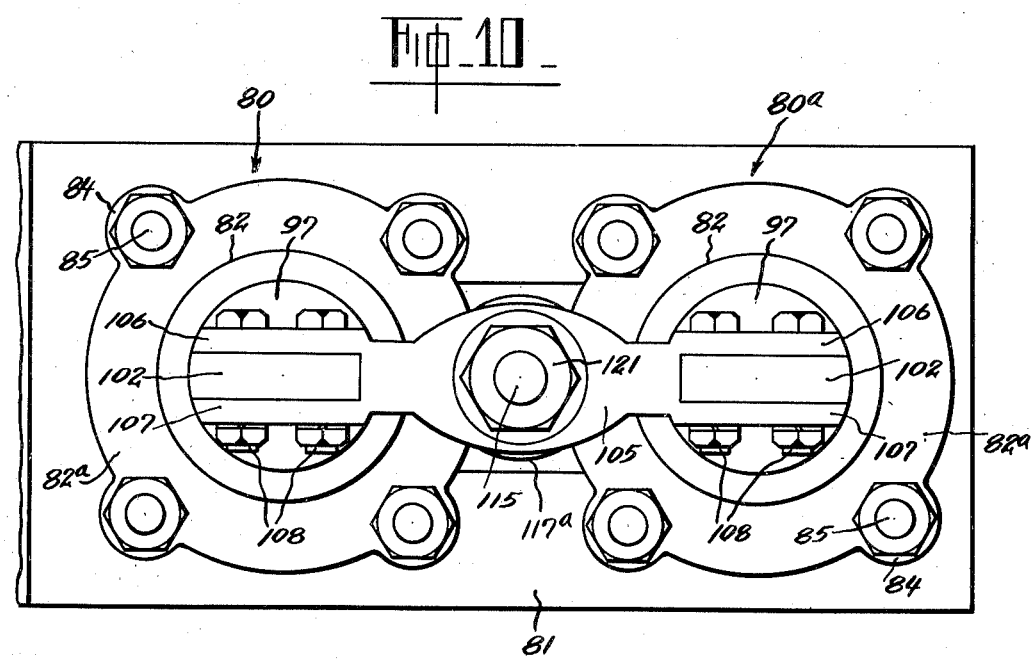
Figure 10 is an end view thereof.

In the drawings, referring to Figure 3, 10 and 10a are the front wheel brakes, and 11 and 11a are the rear wheel brakes. Each brake being identical in structure a description of one, the brake 10, shown in detail in Figures 1 and 2, will suffice. Referring to Figures 1 and 2, the brake mechanism is shown supported on a brake backing plate 12 which is fixedly mounted to the non-rotating wheel supporting structure (not shown). Similarly the drum 13 is fixedly mounted on the wheel (not shown) for rotating movement therewith. Arranged one on each side of the vertical center of the backing plate 12 is a front shoe 14 and a rear shoe 15 with the front shoe of a greater length than the rear shoe. The shoes 14 and 15 are made T-shaped in cross-section and arcuate in length, the opposed upper ends of the shoes being enlarged and provided with the vertical abutment faces 14a and 15a. The face of each shoe is provided with a brake lining 16 attached thereto in any suitable manner as well known in the art.

The shoe 14 at its lower end is provided with a pivot arm securely riveted thereto as at 19, the intermediate portion of the pivot arm having a pair of spaced upward extensions defining a yoke 20 which pivotally straddles the anchor pin 21 carried by the backing plate 12. The pivot arm 18 is fitted within an anchor block 20 riveted as at 21 to the backing plate 12, the end of said pivot arm being formed to provide the inclined faces 22 and 23 which are adapted to normally abut the complementary faces 24 and 25 formed as the end walls of the opening 26 receiving said pivot arm. To accommodate movement of the pivot arm 18 the upper and lower walls are respectively provided with the inclined faces 27 and 28. Formed in the web of the shoe, is a guide slot 30 having diverging walls, there being arranged at the base of the slot a guide pin 31 fixedly secured to the backing plate. As the shoe is moved outwardly into braking engagement with the drum it is guided in its movement by the sliding engagement of the lower wall of the guide slot 30 with the pin 31, in the manner readily apparent.

The structure described above with reference to the shoe 14 is also present in the shoe 15, corresponding parts being given the same reference characters designated A.

Both shoes 14 and 15 are each furthermore provided with a shoe guide 34 adapted to slidably receive in guiding relation the web of the shoe, the shoe guides 34 being arranged intermediate the ends of the shoes 14 and 15 and detachably secured to the backing plate 12 by the screw bolts 35. As stated above, the front shoe 14 is of a greater length than the rear shoe 15, both shoes however being so arranged and anchored on the backing plate 12 that the abutment faces 14a and 15a are disposed in substantially parallel opposed relation each equidistant from the vertical transverse center plane passing through the backing plate, as clearly shown in Figure 1.

The self energizing feature of the brake is preferably arranged only on the front shoe 14 and comprises an arcuate rack 37 having gear teeth thereon rigidly attached to the lower web portion of the shoe by the rivets 38. Meshing with the arcuate rack 37 is a gear tooth sector 39 pivotally mounted on the pin 40 carried by the backing plate 12 and bracket support 41. As will be observed the pivotal mounting of the sector 39 is about an axis (of the pin 40) eccentric to the radial center S of the sector 39, for a purpose to be hereinafter described. To maintain the rack 37 and sector 39 in meshing engagement at all times there is provided a tension coil spring 42 attached at one end to the web of the shoe 14, and at its other end to a bracket 43 fastened to the upper part of said sector, the location of the spring 42 being such that the pull thereof will not exert a turning force on the sector 39 when in the normal position shown in Figure 1. Shoes 14 and 15 are further provided respectively with a pair of releasing springs 45, 46 and 45a, 46a. The springs 45 and 45a are attached at their outer ends to the webs of the shoes 14 and 15 at their upper end portions, the inner ends of the springs 45 and 45a being connected to a common support 47. In a similar manner the outer ends of the springs 46 and 46a are attached to the lower portions of the shoes, the inner ends of the springs being secured to the supports 48 and 49. As will be apparent, the springs 45, 45a, 46, 46a act to pull the shoes or release the same from engagement with the drum when the brake is released, as well as to hold the same clear of the drum when the brake is not applied.

At the upper part of the backing plate 12 and arranged centrally between the abutment faces 14a and 15a of the shoes, is an air brake cylinder 50 to be hereinafter described, which is securely clamped to the backing plate 12 through the medium of the bracket 51 and bolts 52. Projecting outwardly from each end of the brake cylinder 50 are the plungers 53 and 53a which respectively engage the expanding arms 55 and 55a, said arms being pivotally mounted on the stud bolt pins 56 and 56a. In Figure 2, the stud bolt pin 56 is shown fixedly connected to the backing plate 12 with the end thereof supported in the bracket 57 securely attached to the backing plate. The ends of each of the plungers 53—53a are rounded to co-act with the concave surfaces 58 formed on the expanding arms.

The relative position of the brake parts shown in Figure 1 is that for the normal brake inoperative position. While a slight clearance has been shown between the expanding arm 55—55a and the abutment faces 14a—15a, said arm in actual practice will engage said faces, because of the air pressure within the cylinder 50 acting on the plungers 53—53a. When the brake is applied the plungers 53—53a move outwardly against the expanding arms 55—55a which in turn engage the abutment faces 14a—15a of the shoes to force the same into engagement with the drum 13. In view of the floating pivotal connection of the shoes on the pivots 21—21a and the manner in which the same are mounted within the anchor blocks 20—20a a very effective braking is obtained. The anchor block mounting of the shoes also functions to prevent rotation of the shoes or brake band with the drum when the brake is applied. As is well known, the shoes 14 and 15 when applied, are self actuating from the trailing end of the shoe to the point of anchorage of the same. This movement, particularly with reference to the front shoe 14 will when the same is applied operate the sector 39 on the arcuate rack 37, to produce a self-energizing action, in the manner readily apparent.

The air cylinder 50 for each brake comprises a cylindrical body 60 provided at each end with a detachable cap or head 61. The central portion of the cylinder 60 is made of a greater wall thickness than the end portions 62 to define the shoulders 63 which are equally spaced from the cylinder ends. Seated within each end portion of the cylinder 60 is a sleeve 64 the bottom of which is adapted to firmly abut the shoulders 63, said sleeves being provided on the inside walls thereof with longitudinal ball receiving grooves 65, diametrically opposed to each other. Adapted for slidable movement within each sleeve 64 is a piston 66, the length of which is preferably equal to or slightly greater than the length of the sleeve. The left-hand piston 66, viewing Figure 4 is provided with the plunger 53 and the right hand piston 66 is provided with the plunger 53a, said plungers projecting out of the cylinder 60 and having suitable anti-friction bearing engagement with openings in the caps 61. Each of the pistons 66 are provided adjacent their outer ends with diametrically opposed seats or pockets 66a in which are placed the anti-friction ball bearings 67 for co-action with the grooves 65 in the sleeves 64. The balls 67 rolling in the grooves 65 further act to prevent turning of the piston 66 within the sleeve. The diameter of the pistons 66 is considerably less than the diameter of the center portion 68 to thus provide annular pockets 69 when the pistons 66 are in their innermost position, as shown in Figure 4.

Within the variable volume chamber defined by the center portion 68 and pistons 66 is a hollow rubber tube 70, the walls of which are highly flexible. The tube 70 in its normal expanded shape has a cylindrical center portion 71, tapered end portions 72 and flat end walls 73. Projecting laterally outwardly from the center of the center portion 71 is a conventional air fitting or nipple 74, the head 75 of which engages the inside surface of the tube. Arranged on the nipple 74 is a square headed clamping washer 76 which fits within the square opening 77 provided in the wall of the cylinder 60. When the air cylinder 50 is mounted on the brake backing plate 12, the nipple 74 extends outwardly therefrom through a suitable opening. A nut 78 provided on the threaded portion of the nipple 74, acts not only as a means for securing the air cylinder 50 to the backing plate 12, but also acts to tightly clamp the wall of the rubber tube 70 between the head 75 of the nipple and the clamping washer 76 to thus afford an air tight connection. If desired the shank of the nipple 74 may be made square to fit within a square opening in the washer 76, thus providing a positive lock against rotation of the nipple 74 when the lock nut 78 is applied thereto.

With the air tube 70 in position within the cylinder 60, the tapered end portions 72 are reentrant, with the end walls 73 adapted to abut the ends of the pistons 66; the looped ends of the air tube being seated within the annular chambers 69. Thus it is seen that air pressure within the tube 70 will act to expand the same to force the pistons 66 outwardly. With only one air connection to the tube 70, and the type of air seal employed, there can be no question of air loss within the air cylinder 50.

The air cylinders 50 of each of the brakes is under the control of a master air cylinder. In the brake system embodying my invention I employ two master cylinders 80 and 80a, the master cylinder 80 controlling the front brakes and the master cylinder 80a controlling the rear brakes, both of said master cylinders being mounted on a supporting bracket 81, see Figure 9, adapted to be attached at any convenient point to the vehicle chassis.

Inasmuch as both master cylinders are identical only the master cylinder 80 will be described in detail.

The master cylinder 80 comprises a piston section 82 and an air tube section 83, both of said sections being cylindrical and provided with abutting interengaging flanges 82a and 83a, said flanges being further provided with registering ears 84 through which the attaching bolts 85 are passed for attaching the sections to the bracket 81.

The air tube section 83 is provided with an end wall 86 to which is centrally connected a conventional air nipple 87 for attachment of an air hose thereto. Mounted within the section 83 is a cylindrical rubber air tube 88 having a closed end 88a and a flanged end 88b, the outside diameter of the tube being substantially equal to the inside diameter of the section. Arranged within the air tube 88 is a thin metallic sleeve 89 provided with a flange 89a adapted to abut the tube flange 88b. Screws 90 securely fasten both the flanges 88b and 89a to the flange 83a of the section 83. The sleeve 89 snugly engages the inside wall of the flexible air tube 88 and is of a length approximately one-half the length of the section 83, said sleeve 89 acting to guide the reentrant portion 88c of the air tube, in the manner readily apparent.

The flanged end 88b of the rubber air tube is as above set forth tightly clamped between the flange 83a of the section 83 and the flange 89a of the guide sleeve 89, thus affording an air tight connection. Both flanges 88b and 89a are in turn securely locked between the interengaging flanges 82a and 83a of the sections 82 and 83.

Figure 11:
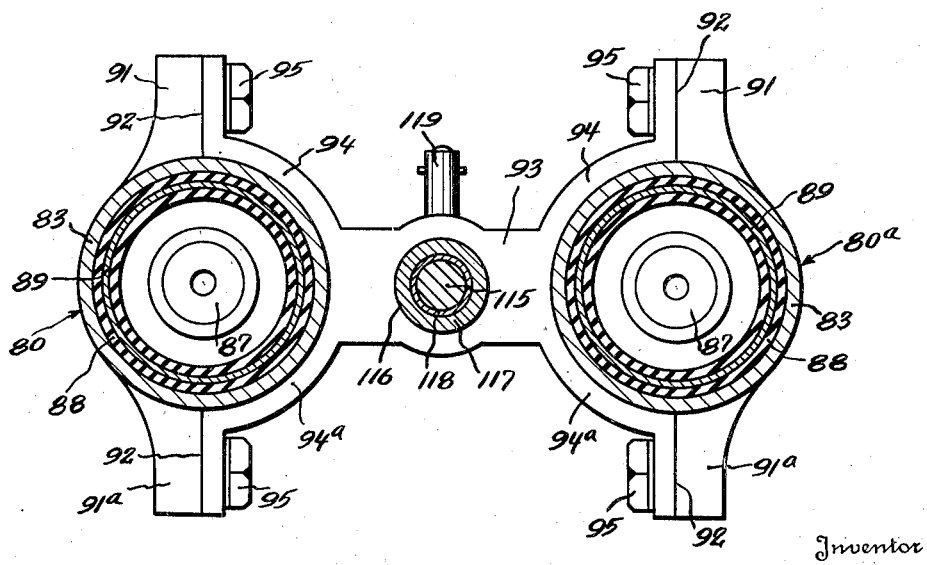
Figure 11 is a sectional view taken on line 11—11, Figure 9.

The sections 83 of both master cylinders are arranged parallel to each other and are similarly positioned in suitable openings in the bracket 81. Each section 83 is provided with a pair of vertically aligned abutments 91—91a, see Figure 11, each provided with flat opposing faces 92. Joining the sections 83 is a rigid bridge member 93 formed at each end with arcuate bifurcated arms 94—94a adapted to engage the flat faces 92 of the abutments 91—91a, and to be detachably secured thereto by the screw bolts 95. This bridge member firmly braces and anchors the air tube sections 83 of the master air cylinders and also acts as a guide and support for the piston actuating member in a manner to be hereinafter described.

Positioned for reciprocating movement within the piston section 82 is a piston member 97 having a length exceeding that of the section 82, the front end of said piston having a packing ring 98 provided thereon, said packing end being located within the guide sleeve 89 in its normal position as shown in Figure 9. Securely attached to this end of the piston by means of the plate 99 and 100 is the end wall 88a of the rubber air tube 88. It is thus seen that movement of the piston 97 inwardly will cause the walls of the rubber tube 88 to roll onto the wall of the the section 83 and at the same time compress the air contained within the section 83. The packing ring 98 which may be saturated with oil acts to prevent the entry of dirt and foreign matter within the sleeve 89.

The other end of the piston 97 which incidently is in the form of a solid cylinder is provided with an integral flat extension 102. The extensions 102 on each of the pistons 97 are arranged in horizontal alignment, see Figure 10 and are rigidly connected by a yoke 105. The yoke 105 is a rigid member and is bifurcated at each end to provide the parallel arms 106—107 which are adapted to straddle the flat extensions 102 and to be detachably secured thereto by means of the bolts 108. To permit the yoke 105 to move inwardly with the pistons 97, each piston section 82 is provided with a slot 110 in the wall thereof.

If desired, anti-friction bearings may be provided between the piston 97 and the walls of the section 82. In such a case the inside wall of the section 82 is provided with a plurality of longitudinal grooves 111 adapted to receive in rolling engagement, the ball-bearings 112 seated in the pockets 113 formed on the piston wall 97. In some cases it may be expedient to provide the grooves on the piston and the ball pockets on the section wall, or combinations of both may be utilized.

Between the master cylinders 80 and 80a is arranged a piston rod 115 adapted to reciprocate intermediate its end in the bridge member 93. To provide for this reciprocatory movement, the bridge member 93 is formed with a transverse opening 116 arranged centrally thereof in which is attached in any suitable manner a guide bushing 117, one end of which is flanged as at 117a for abutting engagement with the flanges 82a of the sections 82, the other end of the guide bushing projecting a slight distance beyond the other side of the bridge member. The inside of the guide bushing 117 is provided with a liner 118 of a bearing metal which may be lubricated through the medium of the lubricant nipple 119.

The piston rod 115 is inserted through the guide bushing 117, said rod being threaded at one end for attachment to the yoke 105, the nuts 120 and 121 on said threaded end permitting of adjustment of said rod on said yoke. The other end of the piston rod 115 is provided with a pair of spaced arms 11a to which one end of a brake rod 123 is connected by the pin 124. A rubber buffer 125 may be interposed between the end of the guide bushing 117 and the arms 122.

Referring to Figure 3, it will be noted that the brake rod 123 connected to the piston rod 115 of the master cylinders 80—80a is connected at its other end to one end of a lever 124 which is mounted at its upper end on a shaft 125. The shaft 125 is operated by the arm 126 and link 127 connected to the hand lever 128. Thus movement of the hand lever backwardly will cause the pistons 97 of the master cylinders to move inwardly to apply the brakes. The lever 124 is also connected by the link 129 to the brake pedal 130, movement of which will also control the master cylinders in the manner readily apparent.

The front brakes 10 and 10a are controlled by the master cylinder 80 while the rear brakes 11 and 11a are controlled by the master cylinder 80a. Thus, pipe 135 connected to the master cylinder 80 communicates with the pipe 136 connected to the brake cylinder 50 in the front brake 10, and with the pipe 137 connected to the brake cylinder 50 in the front brake 10a. Similarly pipe 138 connected to the master cylinder 80a communicates with the pipes 139 and 140 connected to the air cylinders in the rear brakes 11 and 11a. With this arrangement of a double master cylinder and separate connections to the front and rear brakes, should the front brakes fail for some reason, such as a broken connection, etc., the rear brakes would still function and vice versa. It is thus seen that a decided safety factor is accordingly achieved by this construction. Another advantage of this construction is that the air pressure in the front brake system may be reduced so as to reduce the front wheel brakage whereby the danger of skidding on slippery or icy streets may be minimized. If desired, any relationship of air pressures between the front and rear brakes may be resorted to, thus the front brakes being equalized at one pressure and the rear brakes equalized at another.

To determine the brake-lining wear, I have provided a pair of air pressure gages 145 and 146 suitably mounted on the vehicle dash or any other convenient point. Each gage is divided into three zones reading "good", "fair" and "danger", with a pressure controlled needle indicating one of said zones. The gage 145 is connected by the pipe 147 to the pipe 135 which connects the front brake cylinders 50 to the master cylinder 80. The gage 146 is similarly connected by the pipe 148 to the pipe 138 which connects the rear bzrake cylinders 50 to the master cylinder 80a. The gage pipes 147, 148 are respectively provided with shut-off valves 149—149a, and air valves 150—150a. Thus to determine the condition of the brake linings, for example in the front brakes, the same are first applied so that the shoes engage the drum, the shut-off valve 149 is opened and the air under pressure in the front braking system is permitted by a manipulation of the air valve 150 to enter the gage 145. With the lining new or in good condition, the air pressure will be such as to cause the gage needle to ride in the "good" zone. If the lining is in fair condition, because of the decrease in thickness thereof due to wear, the air pressure will be less and accordingly will be such as to cause the gage needle to ride in the "fair" zone. In a like manner should the brake lining be nearly worn through and in bad condition, the gage needle will point to the "danger" zone. It is thus seen that this construction affords a positive, accurate and quick means for determining the actual condition of the brake linings. The air valves 150—150a are of any desired manually operated type and are utilized to provide an adjusted flow of the compressed air into the gages as the shut off valves 149—149a are opened; as without the air valves 150—150a, the sudden rush of compressed air into the gages would prove harmful and destroy their accuracy.

It will be appreciated that the decrease in thickness of the brake lining results in a movement of the brake shoes towards the drum with a consequent increase in the volumetric capacity of the rubber tube 70 within the cylinders 60, thus resulting in a decrease in the air pressure in the brake system (either for the front or rear), as the air therein is under a pretedmined pressure. This reduced air pressure thus becomes a measure of the lining wear as indicated above by the various gage readings.

In some cases because of an excess in the normal air pressure required, the brakes will drag, this condition existing when the brake lining bears against the rotating drum when the brakes are not applied. To indicate this condition, I have provided a pair of small electric light bulbs 155—156 mounted on the dash and connected in parallel to a source of electric energy such as the battery 154. Each brake lining is provided with a suitable contact member 157 carried thereby and by the shoe to which the brake lining is attached. In the front brakes the contact members 157 on the pair of shoes in each brake are connected in parallel by the conductors 158, 159 and 160, to the bulb 155. In a similar manner, in the rear brakes, the contact members 157 on the pair of shoes in each brake are connected in parallel by the conductors 161, 162 and 163 to the bulb 156. The above electrical connections are such that the circuit to the bulbs 155—156 is broken when the shoes and contacts 157 clear the rotating drum. In the event any one of the brake linings in the front brakes drag, the contact 157 carried thereby will engage the drum, closing the circuit and thus lighting the bulb 155. The same result is obtained by the lighting of the bulb 156 in the event any one of the brake linings in the rear brakes drag.

For example, should the front brakes drag, the bulb 155 will light, whereupon the operator of the vehicle will reduce the air pressure in the front brake system to thus permit the springs 45 and 46 in the brakes to pull the brake shoes clear of the drum. A suitable switch 154a is provided whereby when the vehicle is standing or parked, the circuit can be broken so that the bulbs 155—156 will not light. The switch also may be kept open while the vehicle is in operation, being only closed when it is desired to test the brakes for drag.

The pipes 135 and 138 are each provided with an air inlet valve 135a of the type well known which may be connected to a suitable source of compressed air (not shown for charging the master cylinders 80 and 80a. The shut-off valves 149—149a may be of the conventional two-way type so as to also serve as relief valves for releasing the air from either the front or rear brake systems.

It is to be understood that the above described embodiments of my invention are for the purpose of illustration only and various changes may be made therein without departing from the spirit and scope of the invention.

Having thus set forth and disclosed the nature of this invention, what is claimed is:

1. In a brake for a vehicle, a rotatable drum, a stationary backing plate, a front brake shoe and a rear brake shoe, means providing a floating pivotal mounting for each shoe adjacent the lower end thereof, anchor means for the end of each shoe preventing rotation thereof with said drum when the brake is applied, an expanding arm for each shoe pivotally mounted on the backing plate and each arranged in opposed relation to the upper end of its associated shoe, air pressure means mounted on said backing plate and arranged between said expanding arms, and adapted to actuate the same for applying said shoes to said drum and a self-energizing unit associated with said front shoe comprising an arcuate rack on said shoe and an eccentrically mounted sector carried by said backing plate and meshing with said rack.

2. A brake comprising a rotatable drum, a stationary backing plate, front and rear brake shoes, each provided at its lower end with a pivot arm having one end rigidly fixed thereto, a yoke on said arm intermediate the ends thereof, a pivot pin on said backing plate on which said yoke is slidably and pivotally mounted, a hollow anchor block fixed to said backing plate and adapted to receive therein the other end of said pivot arm, abutment faces within said anchor block arranged to be engaged by said other end of said pivot arm, each brake shoe being further provided at its upper end with a guide slot, and a pin fixed to said backing plate for cooperative engagement with said slot; an actuating lever arm for each shoe pivotally mounted on the backing plate and each arranged in opposed relation to the upper end of its associated shoe, air pressure means mounted on said backing plate and arranged between said lever arms and a self-energizing unit associated with said front shoe.

3. In the brake as set forth in claim 2, wherein said self-energizing unit comprises an arcuate rack on said front shoe adjacent the pivot arm thereon, and an eccentrically mounted sector carried by said backing plate and meshing with said rack.

4. In a brake comprising a backing plate and a brake shoe, a mounting for said brake shoe including a pivot arm having one end rigid with the lower end of said brake shoe, an upstanding yoke on said pivot arm providing a floating pivotal connection with a pin on said backing plate, a hollow anchor block fixed to said backing plate receiving the free end of said pivot arm, and angularly related abutment faces within said anchor block arranged to coact with complementary angularly related abutment faces formed at the terminus of said free end.

5. A brake comprising a rotatable drum, a stationary backing plate front and rear brake shoes of unequal length, each brake shoe having an arcuate slot at its upper end slidably mounted on a pin fixed to said backing plate, a pivot arm fixed at one end to the lower end of said shoe, means on said pivot arm providing a floating pivotal connection on a pin fixed to said backing plate, an anchor block fixed to said backing plate receiving the free end of said pivot arm and provided with angularly related abutment faces arranged to be engaged by said pivot arm, an arcuate rack on at least one of said brake shoes adjacent the pivot arm thereon, a toothed eccentric sector rotatably mounted on said backing plate and meshing with said rack, and a spring connecting said eccentric sector with its associated brake shoe, whereby said arcuate rack and eccentric sector in the application of said brake shoe on said rotatable drum will function as a self-energizing unit.

ROBERT DORNO PROVINSON.